(12) United States Patent
Shimoda

(10) Patent No.: US 9,142,848 B2
(45) Date of Patent: Sep. 22, 2015

(54) FUEL CELL VEHICLE AND METHOD OF CONTROLLING FUEL CELL AND STORAGE BATTERY PROVIDED IN THE FUEL CELL VEHICLE

(75) Inventor: Shinsuke Shimoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 411 days.

(21) Appl. No.: 12/871,913

(22) Filed: Aug. 31, 2010

(65) Prior Publication Data

US 2011/0064976 A1 Mar. 17, 2011

(30) Foreign Application Priority Data

Sep. 16, 2009 (JP) ................................. 2009-213980

(51) Int. Cl.
*H01M 8/04* (2006.01)
*H01M 10/44* (2006.01)

(52) U.S. Cl.
CPC ...... *H01M 8/04597* (2013.01); *H01M 8/04895* (2013.01); *H01M 8/04932* (2013.01); *H01M 8/04947* (2013.01); *H01M 10/44* (2013.01); *H01M 2250/20* (2013.01); *H01M 2250/402* (2013.01); *H01M 2250/407* (2013.01); *Y02B 90/12* (2013.01); *Y02E 60/50* (2013.01); *Y02T 90/32* (2013.01)

(58) Field of Classification Search
CPC .............. H01M 8/04895; H01M 8/04; H01M 2250/407; H01M 10/44
USPC ........................................ 429/428, 430, 431
See application file for complete search history.

(56) References Cited

U.S. PATENT DOCUMENTS

| 7,301,302 B2* | 11/2007 | Yoshii ........................... 320/104 |
| 2005/0136311 A1* | 6/2005 | Ueda et al. ...................... 429/30 |
| 2006/0021812 A1* | 2/2006 | Saeki et al. .................. 180/65.3 |
| 2006/0197382 A1* | 9/2006 | Chou et al. ....................... 307/48 |

(Continued)

FOREIGN PATENT DOCUMENTS

| JP | 7-240213 | 9/1995 |
| JP | 2001-095107 | 4/2001 |

(Continued)

OTHER PUBLICATIONS

Chinese Office Action for corresponding CN Application No. 201010258240.3, May 17, 2013.

(Continued)

*Primary Examiner* — Zachary Best
(74) *Attorney, Agent, or Firm* — Mori & Ward, LLP

(57) ABSTRACT

A fuel cell vehicle includes a fuel cell, a storage battery, a fuel-cell-output-controller, and a remaining-capacity-detector. An output of the fuel cell is supplied to a load. An output of the storage battery is supplied to the load. The fuel-cell-output-controller is configured to control the output of the fuel cell. The remaining-capacity-detector is configured to detect a current remaining capacity in the storage battery. The fuel-cell-output-controller is configured to determine and control a reference output value for the output of the fuel cell in accordance with a change in the current remaining capacity in the storage battery, and configured to increase the reference output value as an output of the load becomes higher referring to a state of the output of the load for a specific period of time.

18 Claims, 11 Drawing Sheets

(56) References Cited

U.S. PATENT DOCUMENTS

| | | | |
|---|---|---|---|
| 2007/0196706 A1* | 8/2007 | Sasaki et al. | 429/22 |
| 2008/0220300 A1* | 9/2008 | Jones et al. | 429/23 |

FOREIGN PATENT DOCUMENTS

| | | |
|---|---|---|
| JP | 2001-325976 | 11/2001 |
| JP | 2006-202695 | 8/2006 |
| JP | 2007-128778 | 5/2007 |
| JP | 2008-084769 | 4/2008 |
| JP | 2008-218398 | 9/2008 |

OTHER PUBLICATIONS

Japanese Office Action for corresponding JP Application No. 2009-213980, Jul. 12, 2011.

* cited by examiner

FUEL CELL VEHICLE AND METHOD OF CONTROLLING FUEL CELL AND STORAGE BATTERY PROVIDED IN THE FUEL CELL VEHICLE

CROSS REFERENCES TO RELATED APPLICATIONS

The present application claims priority under 35 U.S.C. §119 to Japanese Patent Application No. 2009-213980, filed Sep. 16, 2009, entitled "Fuel Cell Vehicle." The contents of this application are incorporated herein by reference in their entirety.

BACKGROUND OF THE INVENTION

1. Field of the Invention

The present invention relates to a fuel cell vehicle and a method of controlling a fuel cell and a storage battery provided in the fuel cell vehicle.

2. Description of the Related Art

A typical polymer electrolyte fuel cell includes an electrolyte membrane (electrolyte)-electrode assembly in which an electrolyte membrane formed by a polymer ion exchange membrane (a cation exchange membrane) is held between an anode electrode and a cathode electrode, and separators between which the assembly is held. Fuel cells of this type are in general provided as fuel cell stacks each obtained by stacking a specific number of cells each including an electrolyte membrane-electrode assembly and separators.

In such a fuel cell stack, a fuel gas, for example, a hydrogen-containing gas, supplied to the anode electrode is hydrogen-ionized by an electrode catalyst, passes through the electrolyte membrane moistened to an appropriate level, and moves to the cathode electrode. Electrons produced in this movement are taken by an external circuit and are used as direct-current electric energy. The cathode electrode is supplied with an oxidant gas, for example, an oxygen-containing gas such as air. Therefore, the hydrogen ions, the electrons, and the oxygen react to each other at the cathode electrode, whereby water is produced.

Japanese Unexamined Patent Application Publication No. 2001-325976 ([0064] to [0067] and FIG. 6) proposes a technique relating to a fuel cell vehicle that runs on a fuel cell, such as the one described above, and a storage battery both functioning as drive sources with a motor functioning as a power source.

In the technique proposed by Japanese Unexamined Patent Application Publication No. 2001-325976, the output of the fuel cell is made to follow the degree of accelerator opening (an output required by a load) in such a manner as to become higher as the remaining capacity in the storage battery becomes smaller.

In such a technique, however, in which the output of the fuel cell is controlled to follow the output required by the load, the fuel cell may be overloaded and the durability of the fuel cell may be reduced because of, for example, a high possibility of damage on the electrolyte membrane. Consequently, the durability of the fuel cell vehicle may be reduced.

SUMMARY OF THE INVENTION

According to an aspect of the present invention, a fuel cell vehicle includes a fuel cell, a storage battery, a fuel-cell-output-controller, and a remaining-capacity-detector. An output of the fuel cell is supplied to a load. An output of the storage battery is supplied to the load. The fuel-cell-output-controller is configured to control the output of the fuel cell. The remaining-capacity-detector is configured to detect a current remaining capacity in the storage battery. The fuel-cell-output-controller is configured to determine and control a reference output value for the output of the fuel cell in accordance with a change in the current remaining capacity in the storage battery, and configured to increase the reference output value as an output of the load becomes higher referring to a state of the output of the load for a specific period of time.

According to another aspect of the present invention, a method of controlling a fuel cell and a storage battery provided in a fuel cell vehicle includes controlling an output of the fuel cell to be supplied to a load. A current remaining capacity is detected in the storage battery an output of which is to be supplied to the load. A reference output value for the output of the fuel cell is determined and controlled in accordance with a change in the current remaining capacity in the storage battery. The reference output value is increased as an output of the load becomes higher referring to a state of the output of the load for a specific period of time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

A fuel cell vehicle according to an embodiment of the present invention will now be described with reference to the accompanying drawings.

Figure 1:
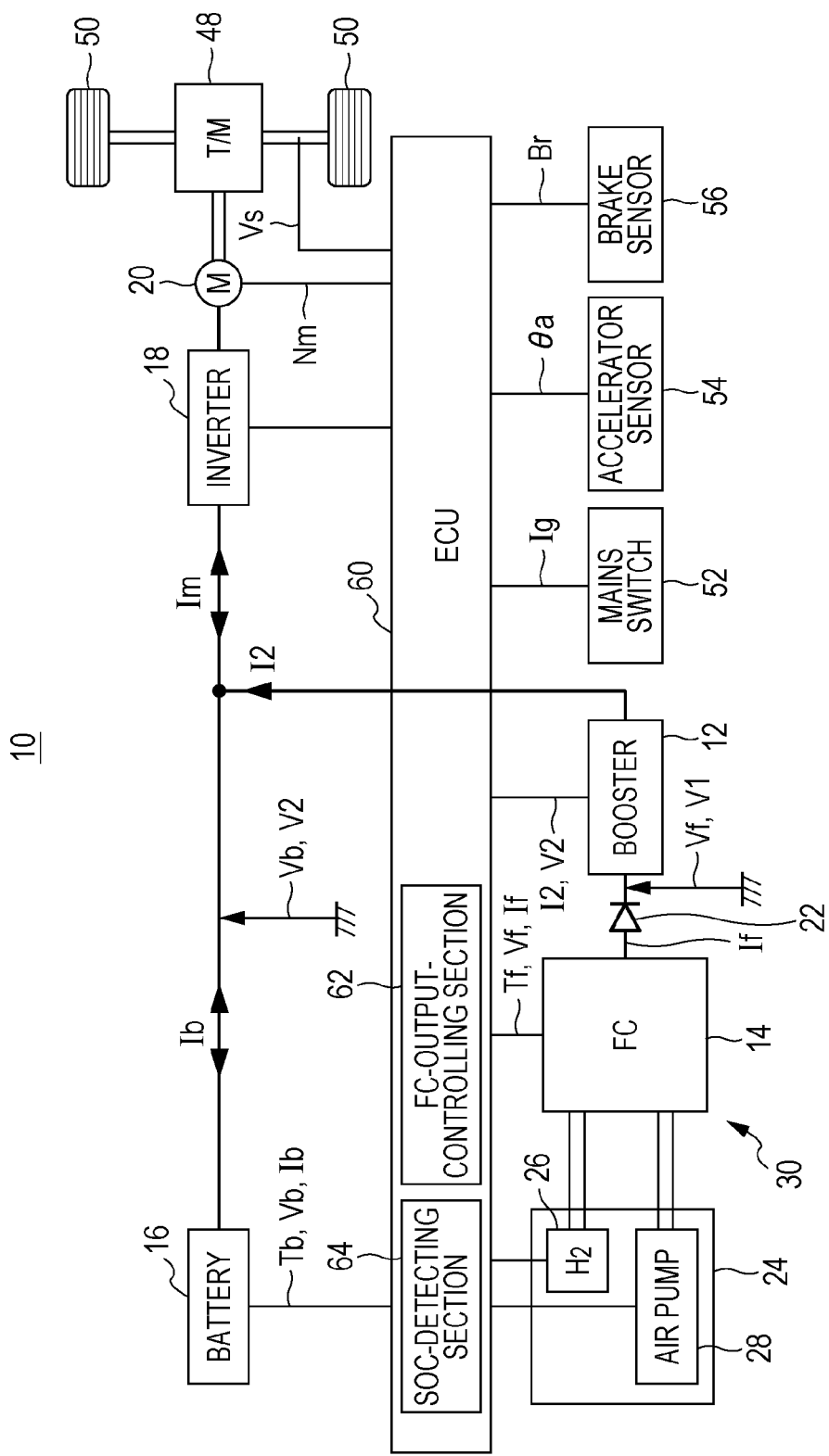
FIG. 1 shows the overall configuration of a fuel cell vehicle according to an embodiment of the present invention.

FIG. 1 shows the overall configuration of a fuel cell vehicle 10 according to the embodiment. The fuel cell vehicle 10 includes a hybrid direct-current power supply system. The system includes a booster 12, a fuel cell 14 provided on the primary side of the booster 12 and generating fuel cell voltage (FC voltage) Vf, i.e., primary voltage V1 (Vf=V1), and a battery 16, which is a storage battery, provided on the secondary side of the booster 12 and generating battery voltage Vb, i.e., secondary voltage V2 (Vb=V2≥V1=Vf). The fuel cell vehicle 10 further includes a drive motor 20, which is a load, to which the power from the hybrid direct-current power supply system is supplied through an inverter 18.

A diode 22 that prevents electric current from flowing into the fuel cell 14 is interposed between the fuel cell 14 and the booster 12. When the diode 22 has electrical continuity, the forward voltage of the diode 22 is negligibly small compared with the FC voltage Vf reaching several hundred volts. Therefore, the following description is based on the premise that the primary voltage V1 of the booster 12 is equal to the FC voltage Vf.

The fuel cell 14 is a stack of cells in each of which, for example, a polymer electrolyte membrane is held between an anode electrode and a cathode electrode. A reactant-gas-supplier 24 is connected to the fuel cell 14 with pipes interposed therebetween. The reactant-gas-supplier 24 includes a hydrogen tank 26 that stores hydrogen (a fuel gas), which is one of two reactant gases, and an air pump 28 that compresses air (an oxidant gas), which is the other reactant gas.

Hydrogen and air supplied from the reactant-gas-supplier 24 to the fuel cell 14 electrochemically react with each other in the fuel cell 14, whereby generating current If, also referred to as fuel cell current (FC current) If, is produced. The generating current If passes through the booster 12, is supplied as secondary current I2 to the inverter 18, and is further supplied as motor current Im (load current in this case) to the motor 20. Meanwhile, an excessive portion of the secondary current I2 is supplied as battery current Ib (charging current in this case) to the battery 16.

A fuel cell system (FC system) 30 includes the fuel cell 14 and the reactant-gas-supplier 24 and is connected to an electronic control unit (ECU) 60.

The ECU 60 includes a fuel-cell-output-controller (FC-output-controller) 62 as a functioning section and detects the fuel cell temperature (FC temperature) Tf, individual cell voltages Vcell, the FC voltage Vf, i.e., a composite voltage of the cell voltages Vcell, and the FC current If of the fuel cell 14 with temperature, voltage, and current sensors (not shown).

The booster 12 is connected to the ECU 60 and converts (boosts) the primary voltage V1, i.e., the FC voltage Vf, into the secondary voltage V2 (V1≤V2), i.e., the battery voltage Vb (Vf≤Vb).

As mentioned above, the ECU 60 detects the FC current If, i.e., the primary current I1, and the FC voltage Vf, i.e., the primary voltage V1, and also detects from the booster 12 the secondary current I2 and the secondary voltage V2 with current and voltage sensors (not shown).

The ECU 60 also detects from the battery 16 battery temperature Tb, the battery voltage Vb, and the battery current Ib with temperature, voltage, and current sensors (not shown), and includes a state-of-charge (SOC)-detector (a remaining-capacity-detector) 64 as a functioning section that detects (calculates) the current state of charge (SOC), i.e., the current remaining capacity, from the foregoing detected values.

Furthermore, the ECU 60 drives the motor 20 through the inverter 18 and detects the number of motor revolutions Nm from the motor 20, thereby detecting the vehicle speed Vs with a wheel speed sensor (not shown).

The motor 20 causes wheels 50 to rotate through a transmission 48.

A mains switch (power switch) 52, an accelerator sensor 54, and a brake sensor 56 are connected to the ECU 60 and supply the ECU 60 with an ignition signal Ig, an accelerator opening signal θa, and a braking amount signal Br, respectively.

The ECU 60 includes a central processing unit (CPU), storage devices such as a read-only memory (ROM) and a random access memory (RAM), a timer, and input/output interfaces such as an analog-to-digital (A/D) converter and a digital-to-analog (D/A) converter, all of the foregoing elements operating as functioning sections among which pieces of information on the states of various switches and values detected by the sensors are shared.

A load output Lt is consumed in accordance with the requirement made by the load (basically, the motor 20 when the fuel cell vehicle 10 is traveling) of the fuel cell vehicle 10, the requirement being determined on the basis of the states of the fuel cell 14, the battery 16, the motor 20, the air pump 28, and supplementary devices (not shown), such as an air conditioner, and the inputs from the switches and sensors. The ECU 60 adjusts and determines the individual proportions of a fuel cell output (FC output) Lf and a battery output Lb in the load output Lt to be covered by the fuel cell 14 and the battery 16, respectively, and, at the time of regeneration of the motor 20, the proportion of a regenerative output Lr to be covered by a regenerative power source. Thus, the ECU 60 drives and controls the battery 16, the fuel cell 14, the reactant-gas-supplier 24, the inverter 18, and the motor 20.

As described in detail below, the FC-output-controller 62 controls the fuel cell 14 by determining a reference output value for the FC output Lf of the fuel cell 14 in accordance with the change in the current SOC of the battery 16. Referring to the state of the load output Lt for a specific period of time, the FC-output-controller 62 increases the reference output value as the load output Lt becomes higher.

The ECU 60 may alternatively be divided into, for example, a motor ECU that controls the motor 20 and so forth, a battery ECU that controls the battery 16, a fuel cell ECU that controls the fuel cell 14, and a general ECU that generally controls the foregoing ECUs and issues commands.

Figure 2:
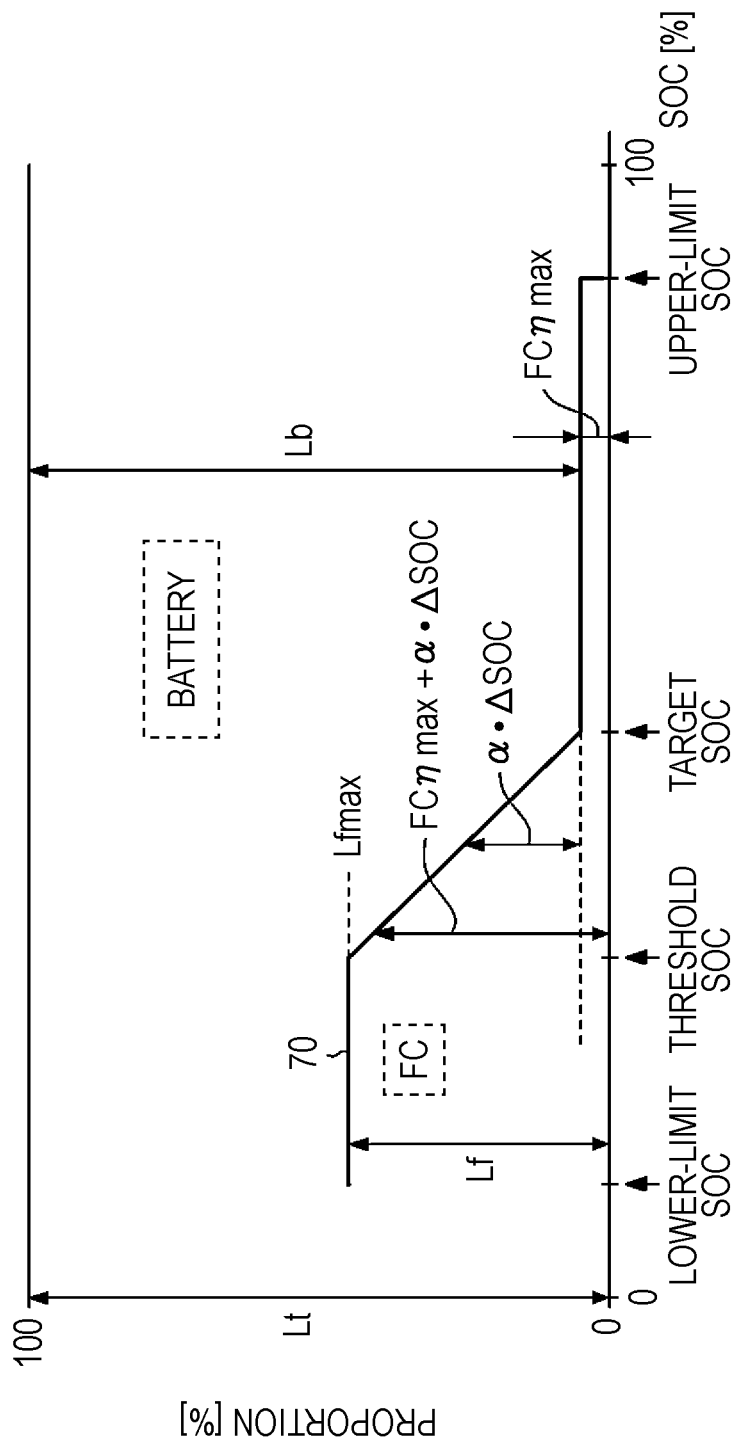
FIG. 2 shows an exemplary characteristic representing the output proportions of a battery output and a fuel cell (FC) output.

FIG. 2 shows an output proportion characteristic 70, an exemplary piece of information that is stored in a storage section (an output-proportion-characteristic-storing section) of the ECU 60 in advance and is to be referred to by the FC-output-controller 62.

As shown in FIG. 2, the battery 16 is basically set to be used in a state where the SOC is between a lower-limit SOC and an upper-limit SOC. In addition, a target SOC of the battery 16 is provided.

Figure 3:
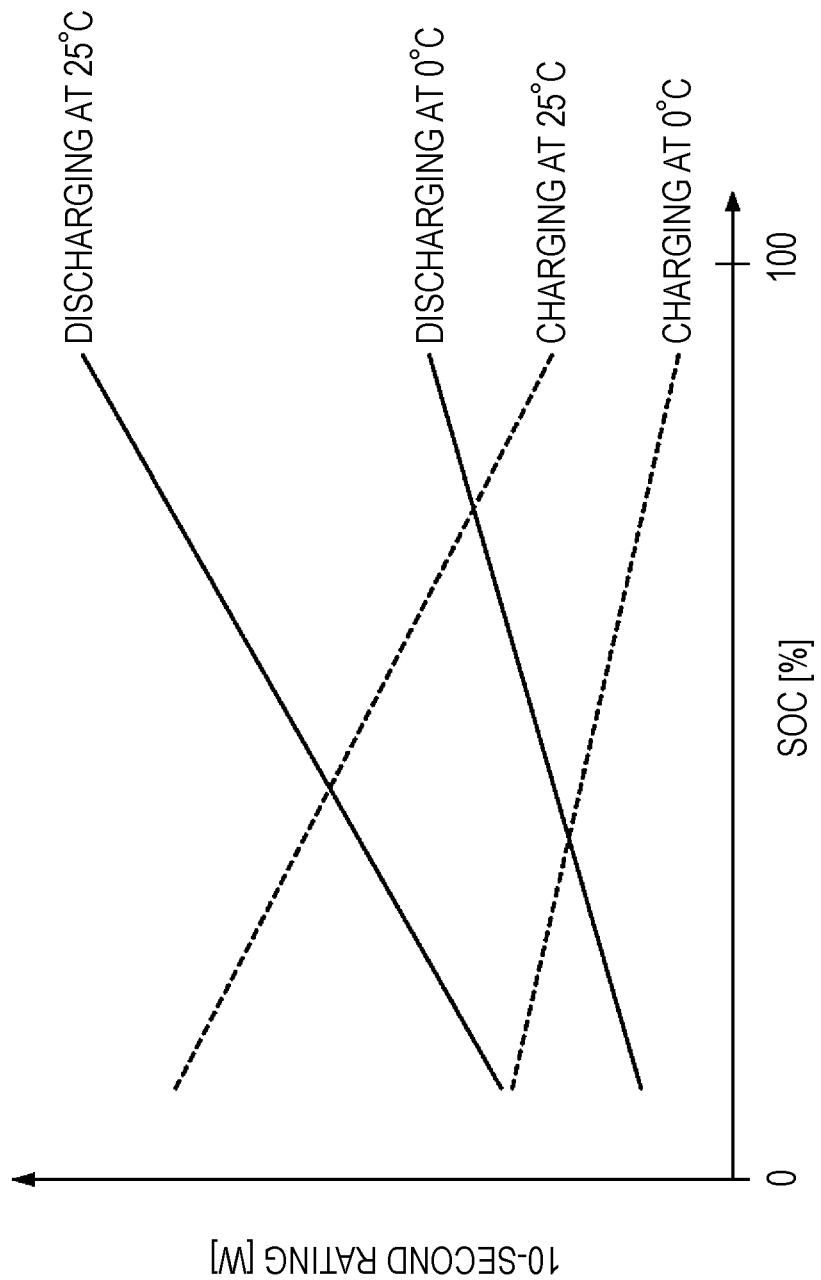
FIG. 3 shows exemplary characteristics representing 10-second ratings of a battery.

To what percentage the target SOC of the battery 16 is to be set depends on the specifications of the battery 16. Regarding the SOC, i.e., the remaining capacity, the battery 16 according to the embodiment has a characteristic represented by 10-second ratings (in watt, or W) shown in FIG. 3. The 10-second rating is a specification indicating how many watts are chargeable or dischargeable for a continuous period of ten seconds. Note that the 10-second rating varies with the battery temperature Tb. On the basis of the 10-second ratings shown in FIG. 3 and so forth, the target SOC is determined.

If the current SOC of the battery 16 detected by the SOC-detector 64 is higher than the target SOC, the battery output Lb is more than sufficient as shown in FIG. 2 and as expressed by Expression (1) below. Therefore, the load output Lt is mostly covered by the battery output Lb (Lb>>Lf).

$$Lt=Lb+Lf=Lb+FC\eta max \approx Lb \qquad (1)$$

Figure 4:
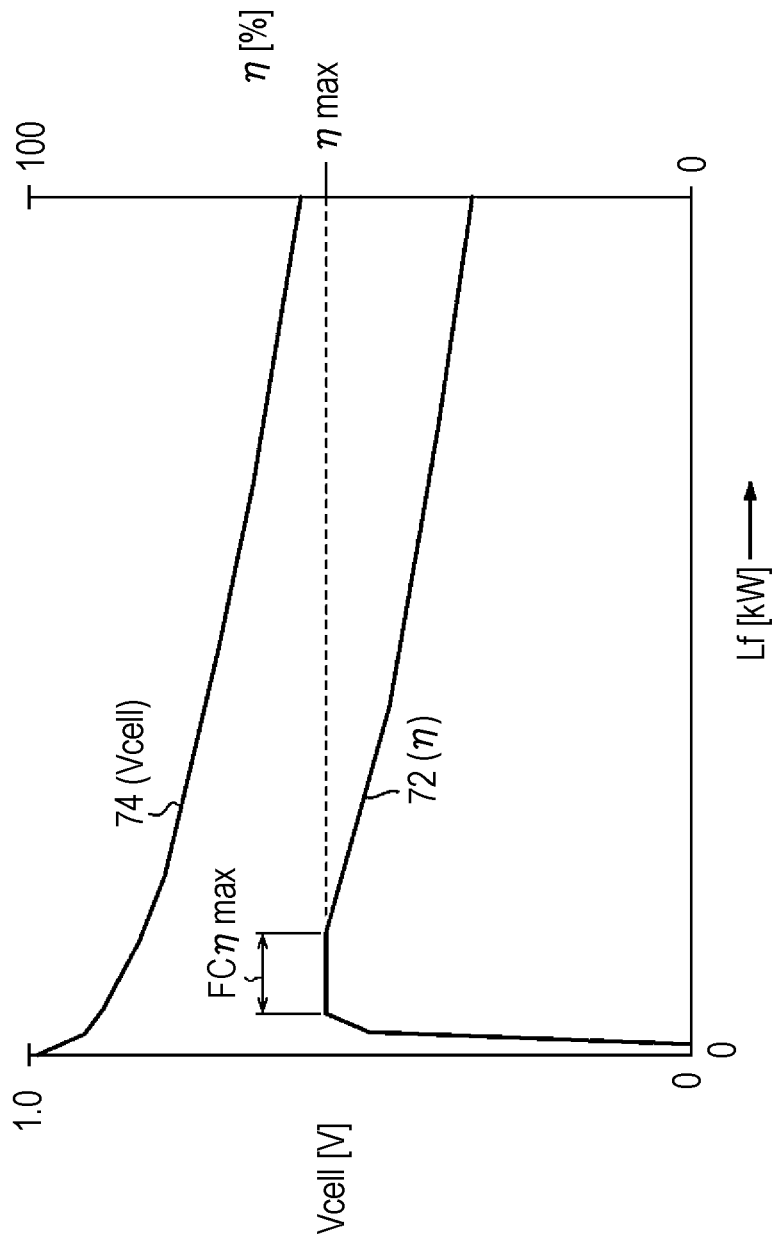
FIG. 4 shows exemplary characteristics representing the relationships between the FC output and cell voltage and between the FC output and efficiency.

FCηmax denotes the maximum-efficiency output. Referring to FIG. 4 showing an efficiency characteristic 72 of the fuel cell 14, the maximum-efficiency output FCηmax is the range of the FC output Lf where the efficiency η of the fuel cell 14 is the maximum efficiency ηmax. FIG. 4 shows a characteristic 74 representing the relationship between the FC output Lf (in kW) and the cell voltage Vcell (in V), as well as the characteristic 72 representing the relationship between the FC output Lf (in kW) and the efficiency η (in %).

FIG. 4 demonstrates that the maximum efficiency ηmax of the fuel cell 14 is obtained when the FC output Lf is low and the cell voltage Vcell is relatively high.

As described with reference to FIG. 2, when the current SOC of the battery 16 is higher than the target SOC, the remaining capacity of the battery 16 is more than sufficient. Therefore, the load output Lt is basically covered by the battery current Ib (discharging current in this case) of the battery 16. To prevent reduction in the durability of the fuel cell 14 due to repeated stoppages and startings of the operation, the fuel cell 14 is controlled to stably generate electricity in a low-generation area in which the consumption of the fuel gas is the smallest and the efficiency is therefore the highest, unless the SOC reaches the upper limit. Thus, reduction in the durability is prevented.

Figure 5:
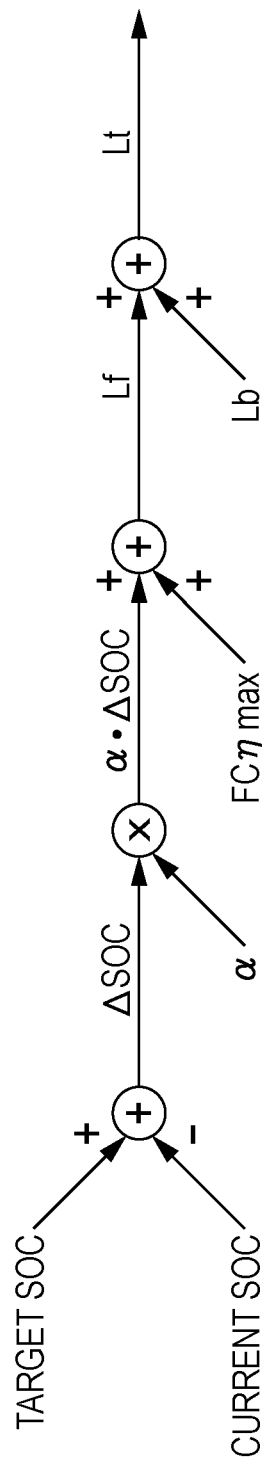
FIG. 5 schematically shows the details of a load output.

Referring to FIG. 2, when the current SOC detected by the SOC-detector 64 is lower than the target SOC, that is, in an area where the current SOC is decreasing, the proportion of the FC output Lf in the load output Lt is gradually increased relative to the proportion of the battery output Lb, as expressed by Expression (2) below and as shown by the schematic diagram in FIG. 5 showing the details of the load output Lt.

$$Lt=Lb+Lf=Lb+\alpha \cdot \Delta SOC+FC\eta max \qquad (2)$$

In Expression (2), ΔSOC denotes the difference, which is calculated by Expression (3) below.

$$\Delta SOC = \text{target } SOC - \text{current } SOC(\%) \qquad (3)$$

In Expression (2), α is a coefficient (coefficient of proportion of the fuel cell output). In the embodiment, α is basically set to be equal to αref, which is a constant value and is referred to as the reference value. Herein, α·ΔSOC is defined as the reference output value of the fuel cell 14.

Figure 6:
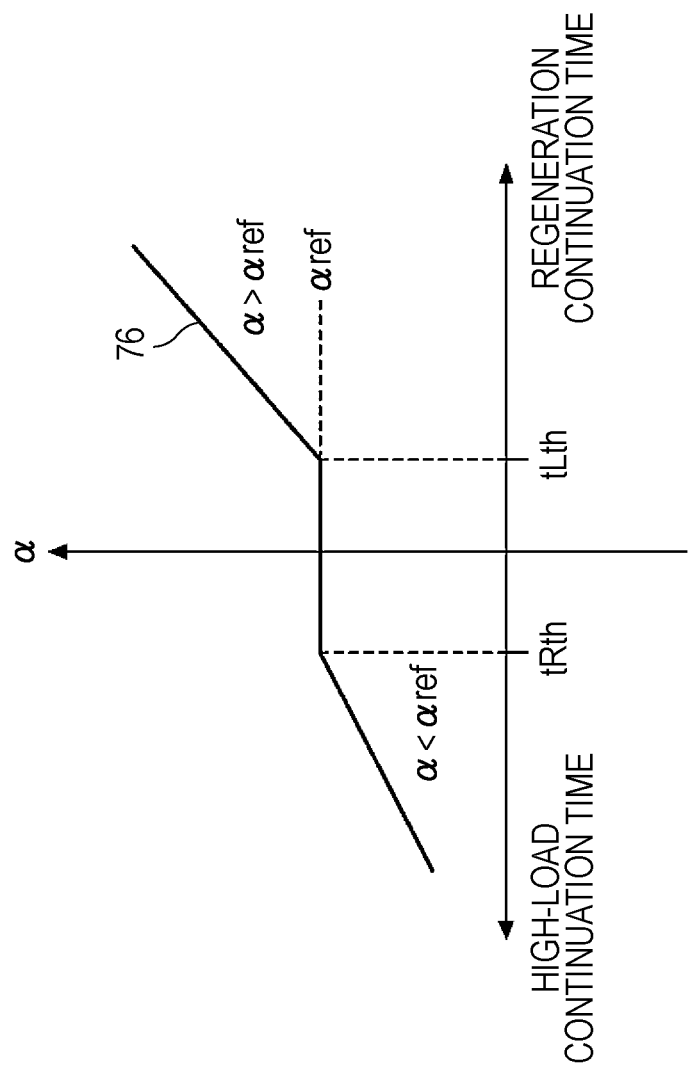
FIG. 6 shows an exemplary characteristic of an adjustable coefficient by which the difference between a target remaining capacity and a current remaining capacity is to be multiplied.

However, as represented by a characteristic 76 shown in FIG. 6, if the load output Lt is continuously high (if the high-load continuation time is longer than a threshold time tLth), a high-load-correction control operation is preferably performed in which the coefficient α is made larger than the reference value αref (α>αref) and the amount of generation by the fuel cell 14 is thus increased, whereas the amount of electric power taken from the battery 16 is reduced and the decrease in the current SOC of the battery 16 is thus suppressed.

If the regenerative output Lr from the motor 20, i.e., the load, is continuously detected (if the regeneration continuation time is longer than a threshold time tRth), a regeneration-correction control operation is preferably performed in which the coefficient α is made smaller than the reference value αref (α<αref) and charging of the battery 16 with the generation by the fuel cell 14 is thus suppressed, whereas the proportion of the regenerative output Lr to be used for the charging of the battery 16 is increased and the fuel gas is thus saved.

The threshold time tLth after which the coefficient α starts to be increased, the threshold time tRth after which the coefficient α starts to be reduced, and the gradient of the coefficient α can be determined on the basis of experiments or simulations. The threshold time tLth and the threshold time tRth may be variable so that the current SOC becomes as close to the target SOC as possible.

Figure 7:
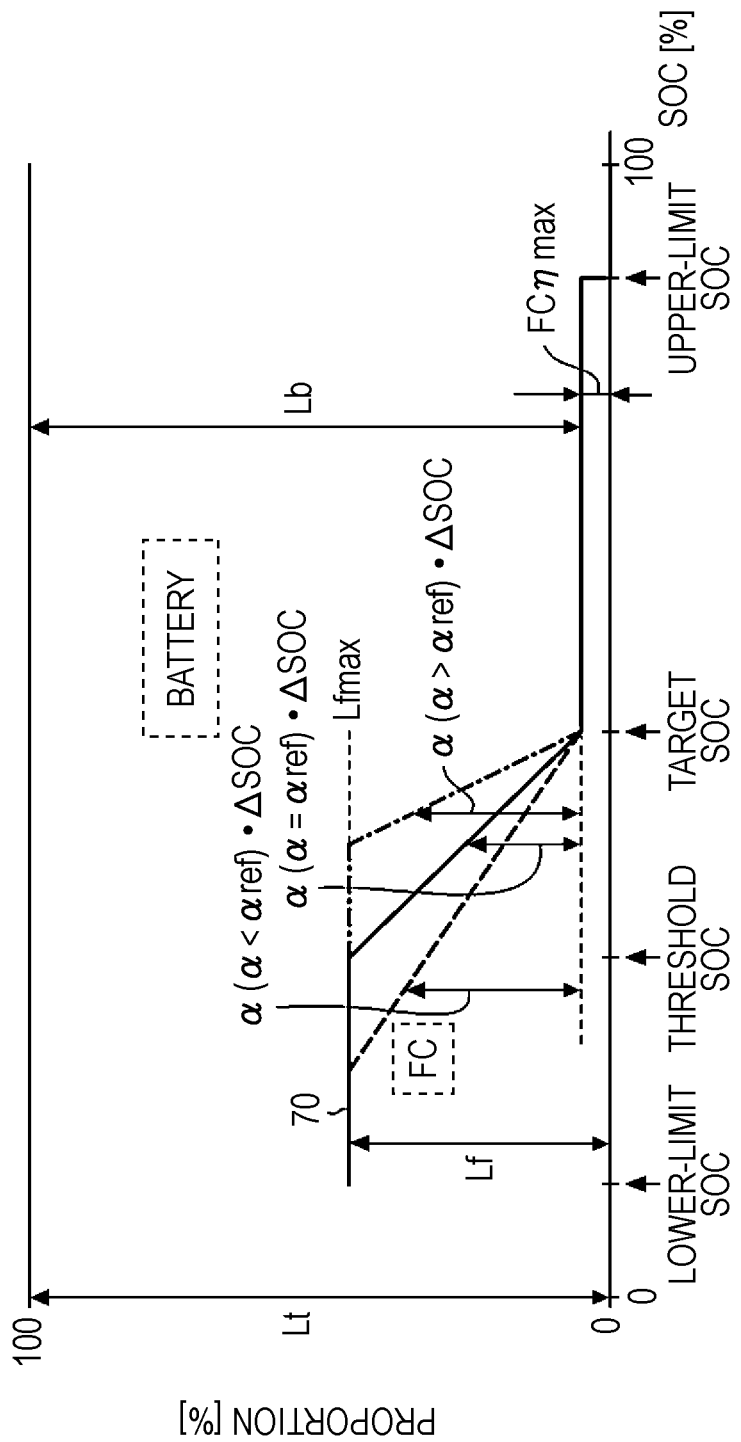
FIG. 7 shows characteristics representing the proportions of the battery output and the FC output, taking into consideration a high-load-correction control operation and a regeneration-correction control operation.

FIG. 7 shows characteristics representing the proportions of the battery output Lb and the FC output Lf, taking into consideration the high-load-correction control operation and the regeneration-correction control operation.

As can be seen from FIGS. 6 and 7, when the current SOC of the battery 16 is higher than the target SOC, the FC output Lf of the fuel cell 14 is set to be smaller than a specific value, in this case, the FC output Lf is set to be the maximum-efficiency output FCηmax. During the control operation in which the proportion of the FC output Lf is increased by adjusting the coefficient α as the current SOC of the battery 16 becomes lower than the target SOC (as represented by the bold solid line shown in FIG. 7 sloping upward from right to left), if it has been determined that the load output Lt is high and such a high state of the load output Lt has been continuing for over the threshold time tLth (a specific period of time), the FC-output-controller 62 increases the coefficient α to be larger than the reference value αref, thereby increasing the rate of increase in the proportion of the FC output Lf (as represented by the bold alternate long and short dashed line in FIG. 7 steeply sloping upward from right to left). Thus, an excessive decrease in the SOC of the battery 16 is prevented.

During the control operation in which the proportion of the FC output Lf is increased by adjusting the coefficient α as the current SOC of the battery 16 becomes smaller than the target SOC (as represented by the bold solid line shown in FIG. 7 sloping upward from right to left), if the regenerative output Lr from the motor 20, i.e., the load, is detected and it has been determined that the period of time for which the regenerative output Lr continues to be detected (the regeneration continuation time) has exceeded the threshold time tRth (a specific period of time), the FC-output-controller 62 reduces the coefficient α to be smaller than the reference value αref, thereby reducing the rate of increase in the proportion of the FC output Lf (as represented by the bold broken line in FIG. 7 gently sloping upward from right to left). Thus, the rate of increase in the FC output Lf is reduced, and the battery 16 is efficiently charged with the regenerative power.

Figure 8A:
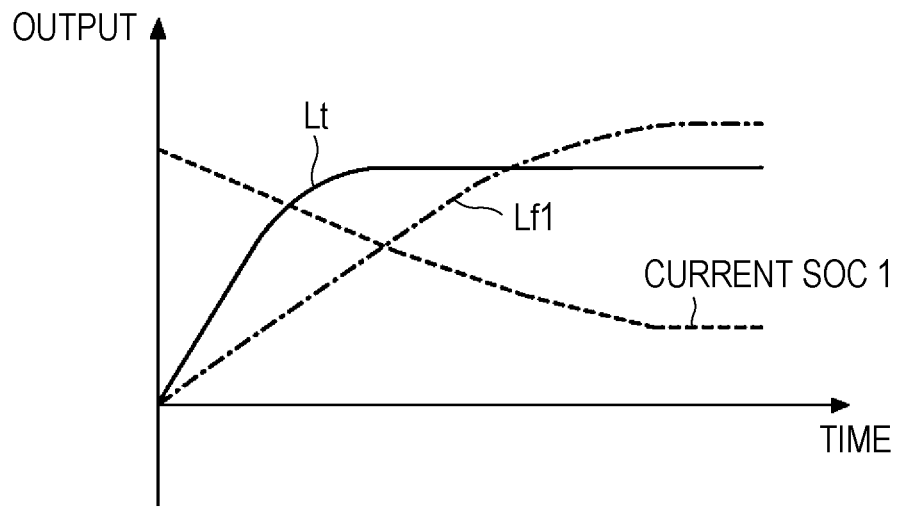
FIG. 8A shows the relationship between the load output, the FC output, and the current remaining capacity in a case where the coefficient is constant.
Figure 8B:
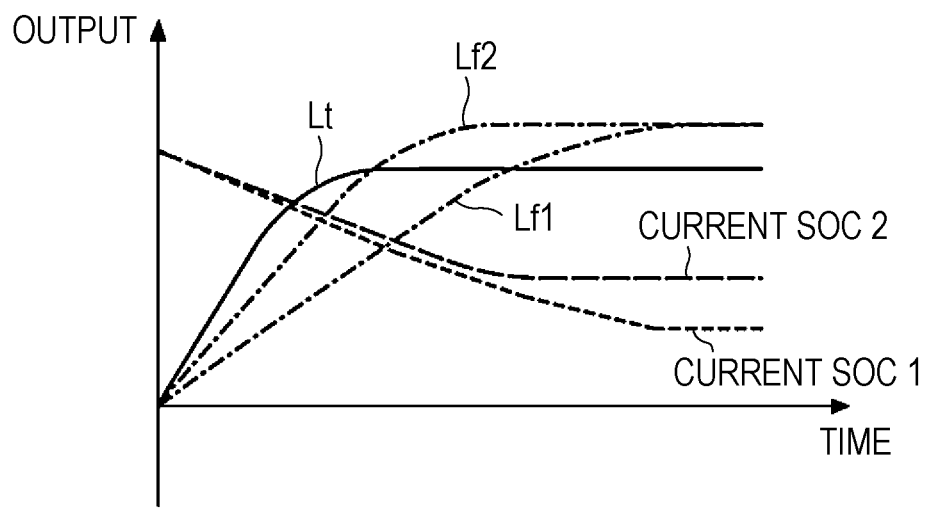
FIG. 8B shows the relationship between the load output, the FC output, and the current remaining capacity in a case where the coefficient is adjusted.

In a case shown in FIG. 8A where the coefficient α is controlled to be equal to the reference value αref, that is, the coefficient α is controlled to be constant, when the FC output Lf, specifically, Lf1, is gradually increased in response to an increase in the load output Lt, the current SOC, specifically, SOC 1, gradually decreases. In a case shown in FIG. 8B where the coefficient α is adjusted, the FC output Lf, specifically, Lf2, responds to the load output Lt more quickly than the FC output Lf1 does. Consequently, the decrease in the current SOC, specifically, SOC 2, stops at a level higher than that in the current SOC 1. However, in a case where the coefficient α is increased, the fuel cell 14 may be deteriorated if the time rate of change in the voltage of the fuel cell 14 is high. Therefore, the time rate of change in the cell voltage Vcell is preferably suppressed to below, for example, an experimentally determined value.

Referring to FIGS. 2 and 7, when the current SOC detected by the SOC-detector 64 is lower than the threshold SOC in the embodiment, the FC output Lf is basically set (fixed) to a maximum FC output Lfmax, as expressed by Expression (4) below.

$$Lt=Lb+Lf=Lb+Lf\text{max} \quad (4)$$

Figure 9:
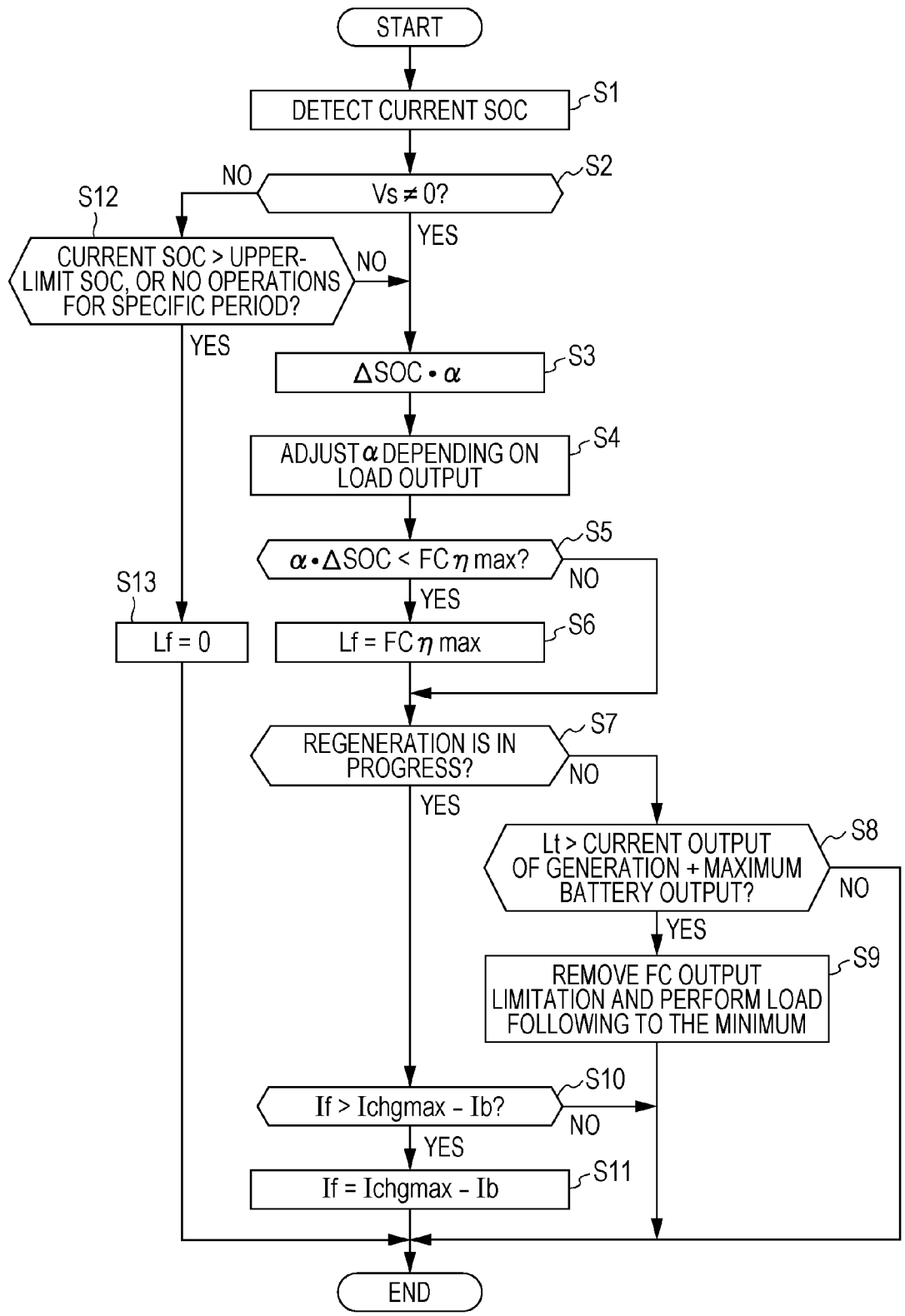
FIG. 9 is a flowchart for describing an operation of a fuel-cell-output-controller included in the fuel cell vehicle.

Referring to the flowchart shown in FIG. 9, an energy management operation performed by the FC-output-controller 62 of the fuel cell vehicle 10 basically configured and operating as described above will now be described.

In Step S1, the FC-output-controller 62 detects the current SOC of the battery 16 through the SOC-detector 64.

Subsequently, in Step S2, the FC-output-controller 62 determines whether or not the vehicle speed Vs of the fuel cell vehicle 10 is zero, that is, whether or not the fuel cell vehicle 10 is traveling.

If the vehicle speed Vs is not zero, that is, if the fuel cell vehicle 10 is traveling forward or backward, the operation proceeds to Step S3, where the FC-output-controller 62 calculates the difference ΔSOC between the target SOC and the current SOC in accordance with Expression (2) given above, and further calculates α·ΔSOC (the reference output value).

In Step S4, the coefficient α is adjusted as described with reference to FIGS. 6 and 7. When the load output Lt is continuously high, the rate of decrease in the current SOC becomes high. Therefore, the amount of generation by the fuel cell 14 needs to be made to respond to the load output Lt quickly. In such a case, the coefficient α is increased, whereby the decrease in, i.e., the consumption of, the current SOC of the battery 16 is suppressed.

Subsequently, in Step S5, the FC-output-controller 62 determines whether or not α·ΔSOC is smaller than the maximum-efficiency output FCηmax. If α·ΔSOC is smaller than the maximum-efficiency output FCηmax (including the cases of negative values), the operation proceeds to Step S6, where the FC output Lf of the fuel cell 14 is set (fixed) to the maximum-efficiency output FCηmax.

In contrast, if it is determined in Step S5 that α·ΔSOC is not smaller than the maximum-efficiency output FCηmax, the operation proceeds to Step S7, where the FC-output-controller 62 determines whether or not the regeneration of the motor 20 is in progress. If the regeneration of the motor 20 is not in progress, the operation proceeds to Step S8, where the FC-output-controller 62 determines whether or not the load output Lt satisfies the condition expressed by Expression (5) below.

$$Lt > \text{current output of generation+maximum battery output} \quad (5)$$

If the load output Lt exceeds the sum of the current output of generation, i.e., FC output Lf, by the fuel cell 14 and the maximum output of the battery 16, the operation proceeds to Step S9, where the FC-output-controller 62 momentarily removes the limitation on the FC output Lf (the maximum FC output Lfmax determined on the basis of the output proportion characteristic 70 shown in FIGS. 2 and 7) at the minimum frequency required. In such a control operation, the FC output Lf is momentarily increased, thereby being able to follow the load output Lt even if the load output Lt occurring when the fuel cell vehicle 10 is traveling is high.

If it is determined in Step S7 that the regeneration of the motor 20 is in progress, the operation proceeds to Step S10, where the FC-output-controller 62 determines whether or not the value obtained by subtracting the charging current Ib produced by the regenerative output Lr from the maximum allowable charging current Ichgmax of the battery 16 (Ichgmax−Ib) exceeds the generating current If produced by the FC output Lf. If the foregoing value exceeds the generating current If, the operation proceeds to Step S11, where the generating current If produced by the FC output Lf is limited to the value of Ichgmax−Ib, whereby the regenerative output Lr is used for charging of the battery 16 as much as possible.

If the result of determination in Step S10 is negative, the FC output Lf of the fuel cell 14 is controlled to be the value based on the α·ΔSOC determined in Step S4, i.e., Lf=α·ΔSOC+FCηmax, or the value determined in Step S6, i.e., Lf=FCηmax (see FIG. 2).

If the result of determination in Step S2 is negative, that is, if the fuel cell vehicle 10 is not traveling or if no operations such as depressing of the accelerator pedal and the like have been performed on the fuel cell vehicle 10 for a specific period of time, the operation proceeds to Step S12. In Step S12, if the current SOC of the battery 16 exceeds the upper-limit SOC (current SOC>upper-limit SOC) or if the load output Lt has been substantially zero for a specific period of time, the operation proceeds to Step S13, where the FC output Lf is set to zero.

Here, the specific period of time is set to about several minutes so that the FC output Lf does not become zero when the fuel cell vehicle 10 is waiting at stoplights or the like.

If the result of determination in Step S12 is negative, the operation proceeds to Step S3 and is further continued.

According to the embodiment described above, the fuel cell vehicle 10 in which the output Lf of the fuel cell 14 and the output Lb of the battery 16 (a storage battery) are supplied to the motor 20 or the like (a load) includes the FC-output-controller 62 that controls the output Lf of the fuel cell 14 and the SOC-detector 64 (a remaining-capacity-detector) that detects the current SOC, i.e., the current remaining capacity, of the battery 16. The FC-output-controller 62 operates such that, when the current SOC of the battery 16 is higher than the target SOC, the load output Lt of the motor 20 is covered by the output Lb of the battery 16 (the proportion of output coverage by the battery 16 is increased by adjusting the discharging current of the battery 16) while the output Lf of the fuel cell 14 is limited to below a specific value, i.e., to the maximum-efficiency output FCηmax in the embodiment. In contrast, as the current SOC of the battery 16 becomes lower than the target SOC, the FC-output-controller 62 increases the proportion of the output Lf of the fuel cell 14 (Lt=Lb+α·ΔSOC+FCηmax).

In this case, the FC-output-controller 62 determines and controls the reference output value α·ΔSOC for the FC output Lf in accordance with the change in the current SOC of the battery 16 detected by the SOC-detector 64, and, referring to the state of the load output Lt for a specific period of time, increases the reference output value α·ΔSOC as the load output becomes higher (see FIGS. 6 and 7).

Since the FC output Lf is determined on the basis of the current SOC of the battery 16 and the state of the load output Lt observed for a specific period of time, not on the basis of real-time load requirement, the change in the output of the fuel cell 14 is suppressed, and the change in the SOC of the battery 16 is suppressed even if the load output Lt is high. Consequently, reduction in the durability of the fuel cell 14 and the battery 16 is prevented.

Furthermore, when the regenerative output Lr from the motor 20 is detected, the FC-output-controller 62 reduces the reference output value α·ΔSOC, whereby unnecessary generation by the fuel cell 14 is prevented and the battery 16 is proactively charged with the regenerative output Lr.

In such a control operation, reduction in the durability of the fuel cell 14 is prevented. That is, since the fuel cell 14 is controlled such that the operation thereof is not stopped frequently while the fuel cell vehicle 10 is running at idle or the like, and such that the change in the amount of generation by the fuel cell 14 is suppressed as much as possible, reduction in the durability of the fuel cell 14 is prevented.

Figure 10A:
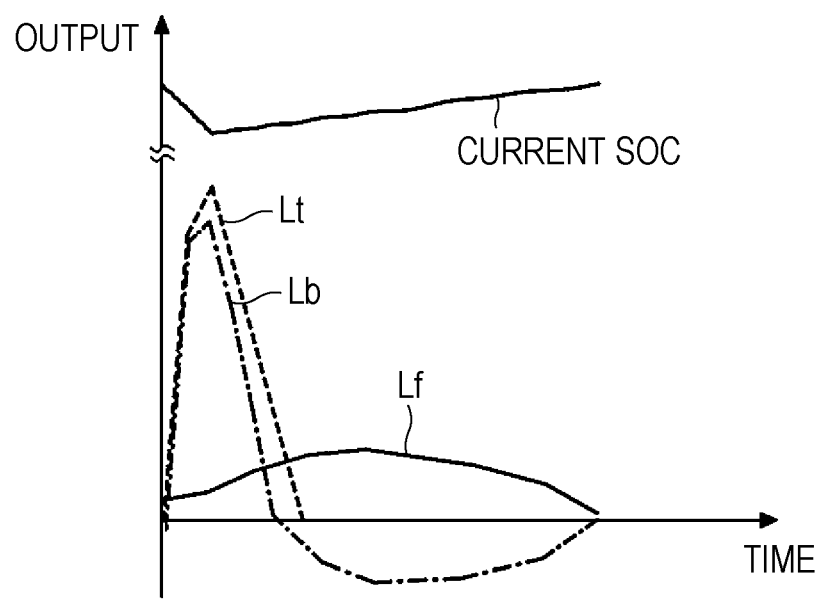
FIG. 10A schematically shows the temporal coverages of the load output by the FC output and the battery output in the embodiment.
Figure 10B:
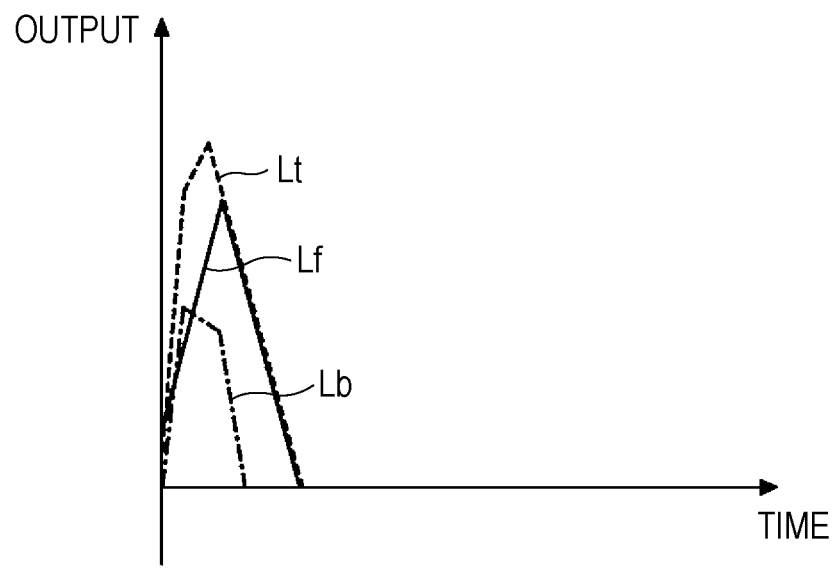
FIG. 10B schematically shows the temporal coverages of the load output by the FC output and the battery output in a comparative example.

FIG. 10A schematically shows the temporal coverages of the load output Lt by the FC output Lf and the battery output Lb in the embodiment. FIG. 10B schematically shows the temporal coverages of the load output Lt by the FC output Lf and the battery output Lb in a comparative example.

In the embodiment shown in FIG. 10A, the battery output Lb quickly responds to and follows the load output Lt. Whereas, in the comparative example shown in FIG. 10B, the battery output Lb and the FC output Lf in combination are made to follow the load output Lt. The change in the FC output Lf in the embodiment shown in FIG. 10A is gentler than in the comparative example shown in FIG. 10B. This proves that, in the embodiment, reduction in the durability of the fuel cell 14 is prevented.

Figure 11A:
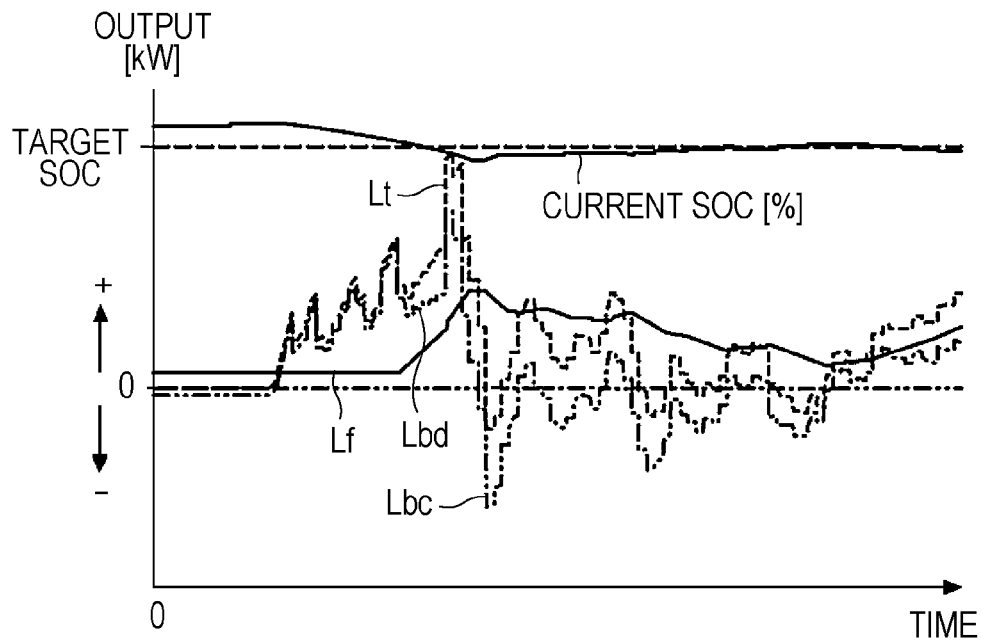
FIG. 11A shows measured values of the current remaining capacity and the temporal coverages of the load output by the FC output and the battery output in the embodiment.
Figure 11B:
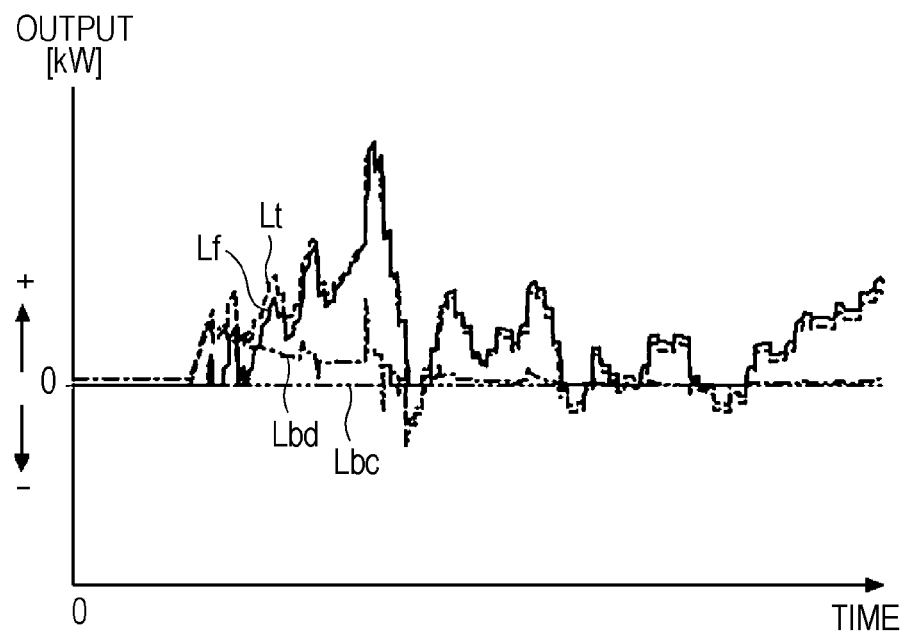
FIG. 11B shows measured values of the temporal coverages of the load output by the FC output and the battery output in the comparative example.

FIG. 11A shows exemplary measured values of the current SOC (in %) and the temporal coverages of the load output Lt by the FC output Lf and the battery output Lb (including a battery discharging output Lbd and a battery charging output Lbc) in the embodiment. FIG. 11B shows measured values of the temporal coverages of the load output Lt by the FC output Lf and the battery output Lb in the comparative example.

In the embodiment shown in FIG. 11A, the battery output Lb (in this case, the battery output Lbd, because the battery output Lbd is for discharging and the battery output Lbc is for charging) quickly responds to and follows the load output Lt, whereas the FC output Lf gradually changes to follow the load output Lt. In contrast, in the comparative example shown in FIG. 11B, the FC output Lf is basically made to follow the load output Lt except at the beginning where the battery output Lbd is made to follow the load output Lt. Comparing the exemplary measured values shown in FIGS. 11A and 11B, the number of increases and decreases in the reactant gas from the reactant-gas-supplier 24, i.e., the number of cycles, in the embodiment shown in FIG. 11A is much smaller than that in the comparative example shown in FIG. 11B.

Furthermore, in the embodiment, when the regenerative output Lr is detected while the FC-output-controller 62 is controlling the proportion of the FC output Lf to be increased with the decrease in the current SOC of the battery 16 from the target SOC (the area controlled with the value $\alpha \cdot \Delta SOC$ in FIG. 2), the FC-output-controller 62 reduces the FC output Lf, thereby reducing the amount of charge to the battery 16 covered by the FC output Lf (NO in Step S5, YES in Step S7, YES in Step S10, and Step S11 is performed). Thus, the regenerative output Lr is fully utilized. At the same time, since the FC output Lf of the fuel cell 14 is reduced, the consumption of the hydrogen gas, i.e., the fuel gas, is suppressed, whereby reduction in the durability of the fuel cell 14 is further prevented.

Furthermore, when the current SOC of the battery 16 is higher than the target SOC, the FC-output-controller 62 controls the FC output Lf of the fuel cell 14 with respect to the load output Lt to be the maximum-efficiency output $FC\eta max$. Thus, with the highly efficient generation of electricity, the consumption of the fuel gas is reduced. In addition, the FC output Lf does not change with the change in the load output Lt. Therefore, reduction in the durability of the fuel cell 14 is prevented.

Furthermore, when the current SOC of the battery 16 has reached the upper-limit SOC, the FC-output-controller 62 controls the FC output Lf to be zero. Thus, overcharging of the battery 16 is prevented, and the consumption of the fuel gas is suppressed.

Furthermore, when the FC output Lf of the fuel cell 14 has reached the maximum output Lfmax while the proportion of the FC output Lf in the load output Lt is controlled to be increased with the decrease in the current SOC of the battery 16 from the target SOC (in the example shown in FIG. 2, when the current SOC has decreased to the threshold SOC), the FC output Lf is fixed to the maximum output Lfmax. Thus, reduction in the durability of the fuel cell 14 is further prevented.

Thus, since the output of the fuel cell is determined on the basis of the current remaining capacity in the storage battery and the state of the output of the load observed for a specific period of time, not on the basis of the real-time requirement made by the load, the change in the output of the fuel cell is suppressed, and the change in the remaining capacity (state of charge, abbreviated to SOC) of the storage battery is suppressed even if the output of the load is high. Consequently, reduction in the durability of the fuel cell and the storage battery is prevented.

The fuel-cell-output-controller preferably reduces the reference output value when a regenerative output from the load is detected. Thus, unnecessary generation by the fuel cell is prevented and the storage battery is proactively charged with the regenerative output.

The fuel-cell-output-controller may detect the change in the current remaining capacity in the storage battery on the basis of a difference between a target remaining capacity and the current remaining capacity in the storage battery.

The fuel-cell-output-controller preferably controls the output of the fuel cell to be a maximum-efficiency output when the current remaining capacity in the storage battery is larger than the target remaining capacity.

In such a control operation in which the output of the fuel cell with respect to the output of the load is controlled to be the maximum-efficiency output when the current remaining capacity in the storage battery is larger than the target remaining capacity, since the maximum-efficiency output of the fuel cell occurs when the output of the fuel cell is low, more efficient charging is realized. In addition, the output of the fuel cell is prevented from changing in response to the change in the output of the load. Therefore, reduction in the durability of the fuel cell is further prevented.

In this case, the fuel-cell-output-controller preferably controls the output of the fuel cell to be zero when the current remaining capacity in the storage battery has reached an upper-limit remaining capacity or when the output of the load has been zero for a specific period of time. Thus, the consumption of the fuel gas is suppressed, and overcharging of the storage battery is prevented.

Furthermore, the fuel-cell-output-controller preferably removes a limitation on the output of the fuel cell when the output of the load exceeds a composite output including a maximum allowable output of the storage battery and a current output of the fuel cell.

In the fuel cell vehicle according to the embodiment of the present invention, the output of the fuel cell and the output of the storage battery are supplied to the load. The vehicle includes the fuel-cell-output-controller that controls the output of the fuel cell and the remaining-capacity-detector that detects the current remaining capacity (current SOC) of the storage battery. The fuel-cell-output-controller operates such that, when the current remaining capacity in the storage battery is larger than the target remaining capacity (target SOC), the output of the load is covered by the output of the storage battery (the proportion of output coverage by the storage battery is increased by adjusting the discharging current of the storage battery) while the output of the fuel cell is limited to below a specific value, preferably, to the maximum-efficiency output. In contrast, as the current remaining capacity in the storage battery becomes smaller than the target remaining capacity, the fuel-cell-output-controller increases the output of the fuel cell. Thus, reduction in the durability of the fuel cell is prevented.

That is, when the current remaining capacity in the storage battery is larger than the target remaining capacity, the output of the load is mostly covered by the output of the storage battery. Furthermore, as the current remaining capacity in the storage battery becomes smaller than the target remaining capacity, the output of the fuel cell is increased. This means that the fuel cell is used at relatively low output levels and the change in the output thereof is as moderate as the change in the remaining capacity (SOC). Therefore, the amount of heat generated by the fuel cell is suppressed to low levels, eliminating the potential occurrence of damage on the electrolyte membrane at high temperature. Thus, reduction in the durability of the fuel cell is further prevented.

Needless to say, the present invention is not limited to the above embodiment, and various other configurations may be employed in accordance with the descriptions provided herein.

What is claimed is:

1. A fuel cell vehicle comprising:
   a fuel cell an output of which is to be supplied to a load;
   a storage battery an output of which is to be supplied to the load;
   a fuel-cell-output-controller configured to control the output of the fuel cell; and
   a remaining-capacity-detector configured to detect a current remaining capacity in the storage battery,
   wherein, if the current remaining capacity becomes lower, the fuel-cell-output-controller is configured to control a reference output value for the output of the fuel cell to become higher so that the output of the fuel cell increases and the output of the storage battery decreases,
   wherein the fuel-cell-output-controller is configured to refer to a state of an output of the load for a specific period of time,
   wherein, if the current remaining capacity becomes lower and the state of the output of the load increases to a predetermined first state, the fuel-cell-output-controller is configured to control the reference output value to become further higher so that the output of the storage battery further decreases,
   wherein the fuel-cell-output-controller is configured to refer to a state of a regenerative output from the load for a specific period of time,
   wherein, if the state of the regenerative output from the load increases to a predetermined second state, the fuel-cell-output-controller is configured to control the reference output value to become lower so that the storage battery is charged with the regenerative output
   wherein the fuel-cell-output-controller is configured to control the reference output value to become lower as the regenerative output is in the predetermined second state, and is configured to continue, during regeneration, an output of the fuel cell at an output value which is set based on the reference output value controlled to become lower, and
   wherein the fuel-cell-output-controller is configured to control a generating current of the fuel cell to become equal to or less than the value obtained by subtracting a charging current produced by the regenerative power from a maximum allowable charging current of the storage battery.

2. The fuel cell vehicle according to claim 1, wherein the fuel-cell-output-controller is configured to reduce the reference output value when a regenerative output from the load is detected.

3. The fuel cell vehicle according to claim 1, wherein the fuel-cell-output-controller is configured to detect the change in the current remaining capacity in the storage battery based on a difference between a target remaining capacity and the current remaining capacity in the storage battery.

4. The fuel cell vehicle according to claim 1, wherein the fuel-cell-output-controller is configured to lower the output of the fuel cell when the current remaining capacity in the storage battery is larger than a target remaining capacity.

5. The fuel cell vehicle according to claim 4, wherein the fuel-cell-output-controller is configured to control the output of the fuel cell to be zero when the current remaining capacity in the storage battery has reached an upper-limit remaining capacity or when the output of the load has been zero for a period of time.

6. The fuel cell vehicle according to claim 1, wherein the fuel-cell-output-controller is configured to remove a limitation on the output of the fuel cell when the output of the load exceeds a composite output including a maximum allowable output of the storage battery and a current output of the fuel cell.

7. A method of controlling a fuel cell and a storage battery provided in a fuel cell vehicle, the method comprising:
   controlling an output of the fuel cell to be supplied to a load;
   detecting a current remaining capacity in the storage battery an output of which is to be supplied to the load;
   controlling via a fuel-cell-output-controller, if the current remaining capacity becomes lower, a reference output value for the output of the fuel cell to become higher so that the output of the fuel cell increases and the output of the storage battery decreases,
   wherein the fuel-cell-output-controller is configured to refer to a state of an output of the load for a specific period of time,
   wherein, if the current remaining capacity becomes lower and the state of the output of the load increases to a predetermined first state, the fuel-cell-output-controller is configured to control the reference output value to become further higher so that the output of the storage battery further decreases,
   wherein the fuel-cell-output-controller is configured to refer to a state of a regenerative output from the load for a specific period of time,
   wherein, if the state of the regenerative output from the load increases to a predetermined second state, the fuel-cell-output-controller is configured to control the reference output value to become lower so that the storage battery is charged with the regenerative output
   wherein the fuel-cell-output-controller is configured to control the reference output value to become lower as the regenerative output is in the predetermined second state, and is configured to continue, during regeneration, an output of the fuel cell at an output value which is set based on the reference output value controlled to become lower, and
   wherein the fuel-cell-output-controller is configured to control a generating current of the fuel cell to become equal to or less than the value obtained by subtracting a charging current produced by the regenerative power from a maximum allowable charging current of the storage battery.

8. The fuel cell vehicle according to claim 2, wherein the fuel-cell-output-controller is configured to detect the change in the current remaining capacity in the storage battery based on a difference between a target remaining capacity and the current remaining capacity in the storage battery.

9. The fuel cell vehicle according to claim 2, wherein the fuel-cell-output-controller lowers the output of the fuel cell when the current remaining capacity in the storage battery is larger than a target remaining capacity.

10. The fuel cell vehicle according to claim 3, wherein the fuel-cell-output-controller lowers the output of the fuel cell when the current remaining capacity in the storage battery is larger than a target remaining capacity.

11. The fuel cell vehicle according to claim 8, wherein the fuel-cell-output-controller lowers the output of the fuel cell when the current remaining capacity in the storage battery is larger than a target remaining capacity.

12. The fuel cell vehicle according to claim 2, wherein the fuel-cell-output-controller removes a limitation on the output of the fuel cell when the output of the load exceeds a composite output including a maximum allowable output of the storage battery and a current output of the fuel cell.

13. The fuel cell vehicle according to claim 3, wherein the fuel-cell-output-controller removes a limitation on the output of the fuel cell when the output of the load exceeds a composite output including a maximum allowable output of the storage battery and a current output of the fuel cell.

14. The fuel cell vehicle according to claim 8, wherein the fuel-cell-output-controller removes a limitation on the output of the fuel cell when the output of the load exceeds a composite output including a maximum allowable output of the storage battery and a current output of the fuel cell.

15. The fuel cell vehicle according to claim 9, wherein the fuel-cell-output-controller removes a limitation on the output of the fuel cell when the output of the load exceeds a composite output including a maximum allowable output of the storage battery and a current output of the fuel cell.

16. The fuel cell vehicle according to claim 10, wherein the fuel-cell-output-controller removes a limitation on the output of the fuel cell when the output of the load exceeds a composite output including a maximum allowable output of the storage battery and a current output of the fuel cell.

17. The fuel cell vehicle according to claim 11, wherein the fuel-cell-output-controller removes a limitation on the output of the fuel cell when the output of the load exceeds a composite output including a maximum allowable output of the storage battery and a current output of the fuel cell.

18. The fuel cell vehicle according to claim 5, wherein the fuel-cell-output-controller removes a limitation on the output of the fuel cell when the output of the load exceeds a composite output including a maximum allowable output of the storage battery and a current output of the fuel cell.

* * * * *